UNITED STATES PATENT OFFICE.

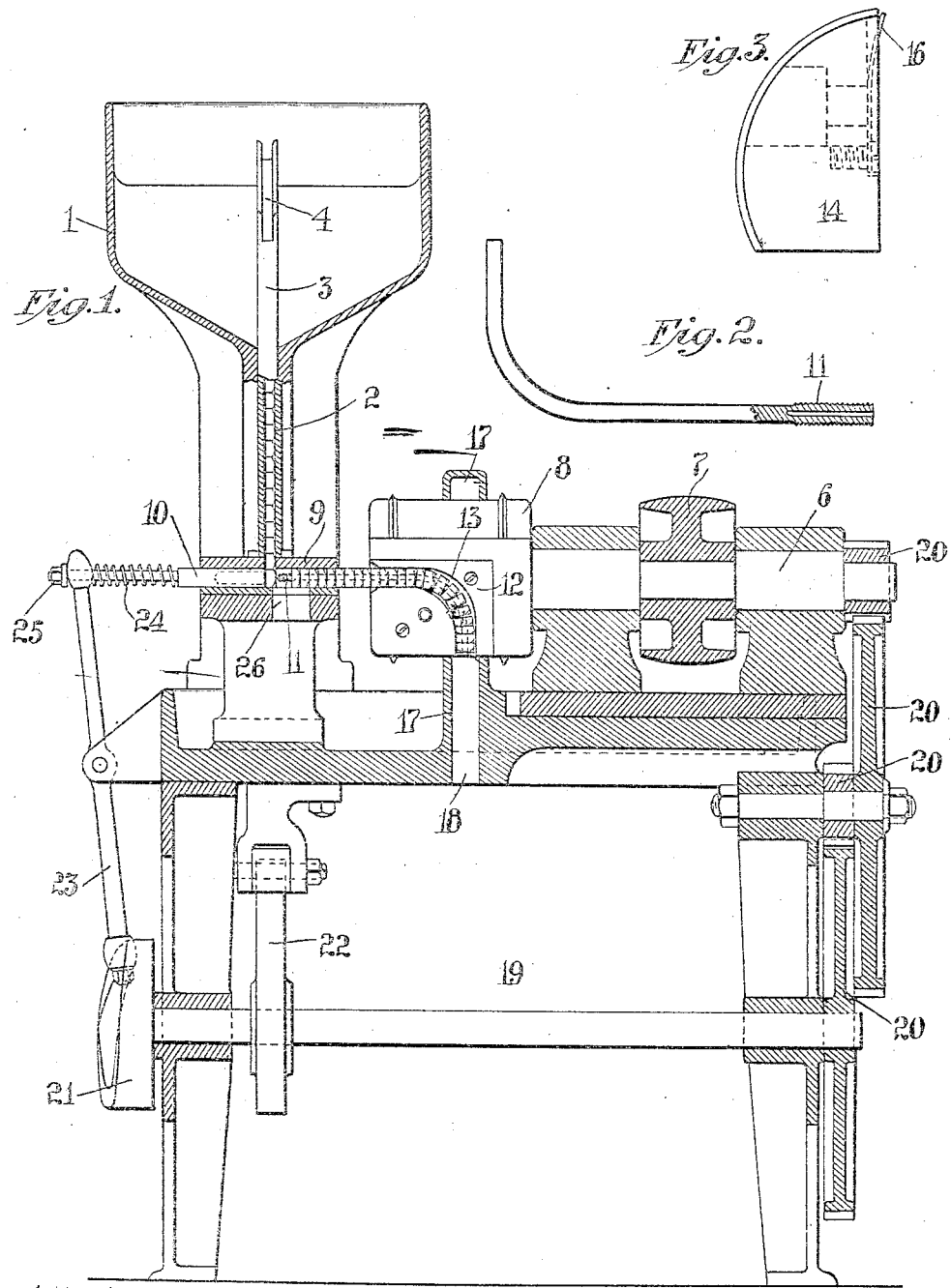

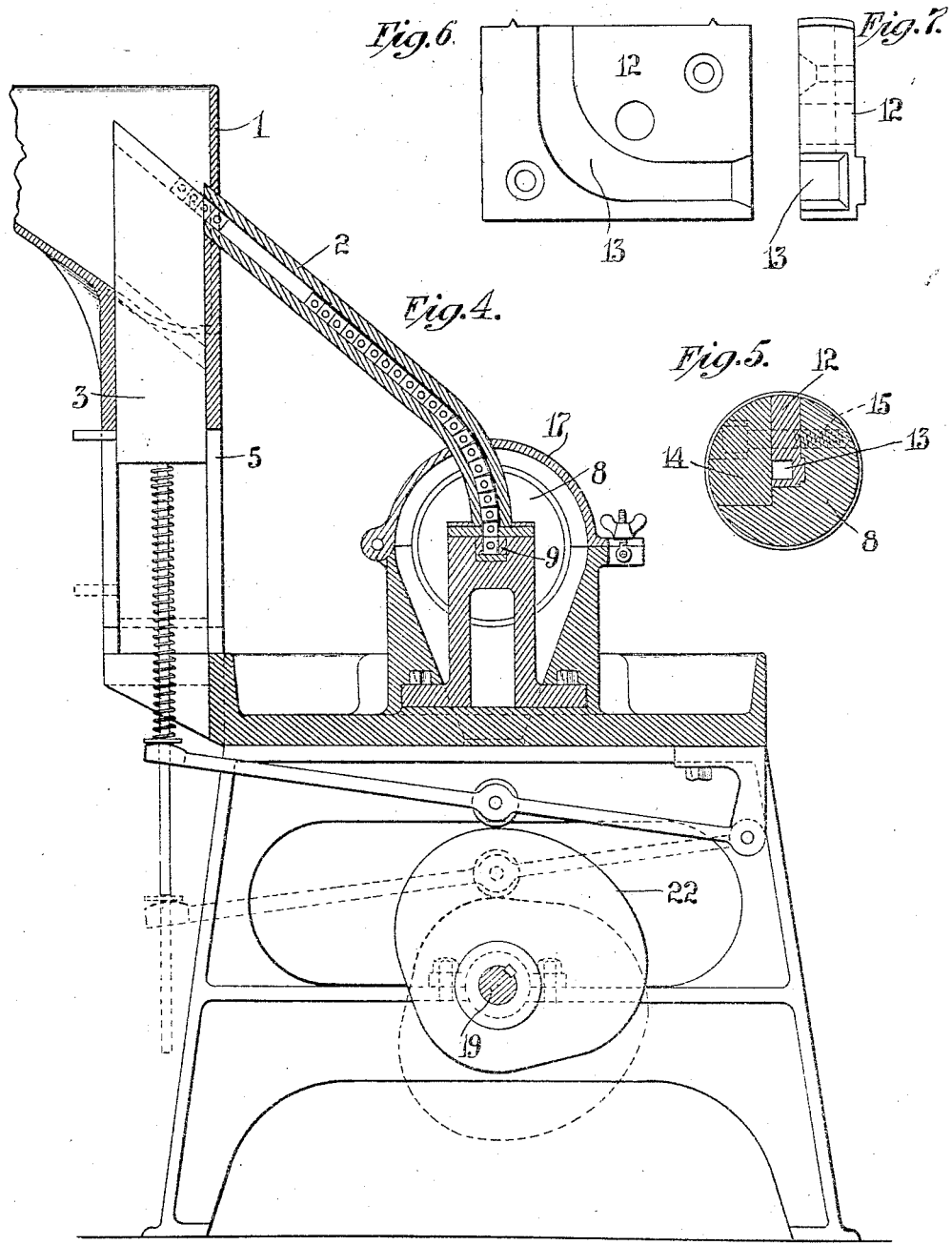

JOHN ALEXANDER JOHNSTON, OF MONTREAL, QUEBEC, CANADA.

TAP-HOLDING CHUCK FOR NUT-TAPPING MACHINES.

1,113,444.  Specification of Letters Patent.  Patented Oct. 13, 1914.

Application filed December 20, 1910. Serial No. 598,405.

*To all whom it may concern:*

Be it known that I, JOHN ALEXANDER JOHNSTON, of 74 Bruce avenue, in the city of Montreal, in the Province of Quebec, Canada, a Canadian citizen, have invented a certain new and useful Tap-Holding Chuck for Nut-Tapping Machines, of which the following is a specification.

This invention relates to automatic nut tapping machines and comprises an improved tap holding chuck for use in nut tapping machines of the type wherein a tap having a bent shank is employed, and wherein nuts are fed progressively along said tap and its shank, and through the chuck.

The object of the invention is to provide an improved chuck for nut tapping machines of the type referred to.

The accompanying drawings illustrate one form of machine embodying the invention.

In said drawings: Figure 1 shows a longitudinal vertical section of the machine; Fig. 2 a detail elevation and partial section of the screw tap and nut-guide; Fig. 3 is an end view of the chuck cap; Fig. 4 is a transverse vertical section of the machine through the feed chute; Fig. 5 is a transverse section of the chuck; Fig. 6 is an elevation of the tap holder; and Fig. 7 is an end view of the tap holder.

In the drawings, 1 designates a hopper from which the nut blanks to be tapped are fed, 2 designates a chute into which the nut blanks are delivered from the hopper and which conveys said nut blanks to the nut holder, and 3 designates a vertically reciprocating nut feeder having an oblique upper surface and provided in said surface with a groove 4 of a width adapted to hold the nuts edgewise. This nut feeder reciprocates up and down, through an opening in the bottom of the hopper, in guides 5. The means for reciprocating said nut feeder will be referred to hereinafter.

6 designates a driving shaft, mounted in suitable bearings in the frame of the machine and provided with a belt pulley 7 whereby it may be driven. Upon this shaft 6 is mounted the chuck 8. In axial line with the said chuck there is a nut holder 9, located at the end of the chute 2; and opposite this nut holder, and mounted to slide in an orifice in the frame of the machine, there is a plunger 10, reciprocated as hereinafter described, and adapted to force the nut blanks successively into the nut holder. Within the nut holder is the screw tap, 11— this tap being extended at its rear end to form a guide for the threaded nuts, the said guide being bent as indicated particularly in Figs. 1 and 2.

The chuck 8 comprises a tap holder 12 (Figs. 5 and 6), having in it a curved nut-passage 13, curved so as to discharge the nuts at the periphery of the chuck; and within this curved nut passage fits the bent rear end of the tap 11. This nut-passage 13 is open on one side, so far as the tap holder is concerned, such open side being normally closed by a removable chuck cap 14 normally held in place by means of screws 15. A flat spring 16 embedded in a groove in the chuck cap, engages the nuts as they reach the peripheral opening of the nut passage 13, holding the nuts successively against discharge, until they are positively pushed out by the nuts behind them. The portion of the chuck in which this peripheral discharge opening is located is surrounded by a channeled casing 17 forming a part of the frame of the machine, and leading to a discharge opening 18.

19 designates a cam shaft driven from shaft 6 by means of gears 20, and upon this cam shaft is mounted a face cam 21 for operating the plunger 10, also another cam 22 for operating the nut feeder 3. Cam 21 operates a pivoted lever 23, working against a spring 24 mounted upon the plunger 10, and engaging, on its rear side, a nut 25 carried by that plunger, whereby, as lever 23 is vibrated by cam 21, the plunger 25 is first withdrawn from beneath the feed chute 2 to permit a nut blank to drop from said chute in front of the nut holder 9, and then is thrust forward, pushing the nut against the end of the tap. Since this tap is revolving, the nut, so forced upon the tap, is threaded and then passes backward along the tap, pushing before it the nuts previously threaded and mounted on said tap.

When first starting the machine, the chuck cap 14 is removed, and the tap 11 is put in place, and to hold it central with respect to the chuck, enough nuts are mounted upon the rear end of this tap to fill the nut passage 13, as shown in Fig. 1. The chuck cap is then replaced, the hopper filled, and the machine started in operation. As the nut feeder 3 rises through the mass of nut blanks within the hopper, several of said blanks will be caught in the groove 4 in the top of the feeder, and when said groove is opposite the mouth of the chute 2, (where it remains for a short time, due to a dwell provided on the corresponding portion of the cam 22) the blanks so held in said groove will slide into the chute 2 and will fall down said chute to the end thereof, where they are held by the plunger 10. At a time determined by the cam 21, the plunger 10 moves back, so permitting one nut blank to drop from the chute 2 in front of the nut holder 9, and then immediately the plunger 10 forces this blank upon the end of the tap 11, holding it there a sufficient time so that the tap will fully engage said blank and start the thread therein. It is not necessary that the plunger hold the nut against the tap until the blank has been completely threaded, and when the threading of the nut has progressed sufficiently, the plunger 10 is withdrawn, another blank drops in front of it and then this second blank in turn is pressed against the end of the tap; and so on. As the nuts are threaded, they are forced back along the tap, and in turn the nuts already on the rear end of the tap are forced past the spring 16 and fall through the channel 17 out of discharge opening 18. Since the plunger 10 is driven forward through the spring 24, if by chance a blank should jam in front of this plunger, no breakage will occur; and an opening 26 is provided through which any nuts which may jam in the machine may be removed. As indicated in Fig. 1, the end of the plunger is bored to receive the tap, so that the tap may not be injured by contact with the end of the plunger.

The bent rear end or shank of the tap affords means for rotating said tap by the action of the chuck, while at the same time permitting the nuts to be fed backward over said shank and through the chuck, continuously.

What I claim is:—

A tap holding chuck for nut tapping machines comprising in combination a main chuck section, a tap holder removably secured thereto and having within it a crooked nut passage open at both ends and at one side, and a chuck cap closing the open side of said passage.

In testimony whereof I have signed this specification in the presence of two subscribing witnesses.

JOHN ALEXANDER JOHNSTON

Witnesses:
CHARLES W. HOPE,
CHAS. F. DICKERSON.